United States Patent [19]

Aldridge, Jr. et al.

[11] Patent Number: 4,976,025
[45] Date of Patent: Dec. 11, 1990

[54] TEST ASSEMBLY FOR MACHINE TOOL HAVING HYDRAULIC PALLET ASSEMBLIES

[76] Inventors: Billie A. Aldridge, Jr., 4368 Highway 41-A; Roger J. Stone, 2042 Old Corydon Rd., both of Henderson, Ky. 42420

[21] Appl. No.: 411,566

[22] Filed: Sep. 22, 1989

[51] Int. Cl.$^5$ .............................................. B23Q 7/00
[52] U.S. Cl. ..................................... 29/563; 29/33 P; 408/2; 409/149; 198/346.1
[58] Field of Search ........................... 198/346.1, 346.2; 269/23, 25; 29/33 P, 563, 564; 408/2, 70; 409/149

[56] References Cited

U.S. PATENT DOCUMENTS

| | | | |
|---|---|---|---|
| 4,449,277 | 5/1984 | Hasegawa et al. | 29/563 |
| 4,520,919 | 6/1985 | Keitaro | 269/25 |
| 4,669,161 | 6/1987 | Schelsky, Jr. | 29/563 |
| 4,890,371 | 1/1990 | Camloh et al. | 29/33 P |

FOREIGN PATENT DOCUMENTS 197142  9/1986  Japan .................................. 198/346.1

Primary Examiner—Daniel W. Howell
Attorney, Agent, or Firm—Tarolli, Sundheim & Covell

[57] ABSTRACT

A machine tool has an array work stations which includes a plurality of machining stations. A plurality of hydraulic pallet assemblies are provided to hold workpieces to be machined. The hydraulic pallet assemblies are movable along a main track which extends through the work stations. Each of the hydraulic pallet assemblies includes hydraulic actuators which operate clamps to grip a workpiece. A test station is disposed to one side of a path of movement of the hydraulic pallet assemblies between the various work stations. A motor at the test station is operable to move a pallet assembly from the main track to a secondary track located at the test station. A connector assembly at the test station connects hydraulic fluid pressure with the hydraulic pallet assembly to operate the clamp assemblies under the same hydraulic pressure that they are actuated at a work station.

17 Claims, 6 Drawing Sheets

TEST ASSEMBLY FOR MACHINE TOOL HAVING HYDRAULIC PALLET ASSEMBLIES

BACKGROUND OF THE INVENTION

The present invention relates to a new and improved method and apparatus for use with a machine tool having hydraulic pallet assemblies which transport workpieces between work stations.

A known machine tool has hydraulic pallet assemblies which are used to move workpieces along a track between work stations. Each of the hydraulic pallet assemblies includes a clamp assembly. The clamp assembly securely holds a workpiece while machining operations are performed on the workpiece at a work station.

During operation of the machine tool, static hydraulic charges are placed on the clamp assemblies to securely grip the workpieces. The static hydraulic charges are maintained throughout movement of the hydraulic pallet assemblies between work stations. There are no hydraulic lines which move along with the hydraulic pallet assemblies. However, the static hydraulic pressures urging the clamp assemblies to their engaged conditions are checked and, if necessary, recharged at the work stations.

Due to their complexity and the conditions under which they are used, the hydraulic pallet assemblies periodically malfunction. Each time a hydraulic pallet assembly malfunctions, the pallet assembly has to be tested and the test results analyzed to determine the cause of the malfunction. The hydraulic pallet assembly is then repaired. The time required to test and repair a hydraulic pallet assembly interrupts normal operations of the machine tool.

When a hydraulic pallet assembly malfunctions, there are several different ways of proceeding. Perhaps the easiest way of proceeding is to do nothing and allow the defective hydraulic pallet assembly to circulate in the machine tool. This results in reduced output until the defective hydraulic pallet assembly is either replaced or repaired. If an attempt is made to repair a defective hydraulic pallet assembly while it is in the machine tool, the operation of the machine tool is interrupted while the repair is made. If it is decided to replace the defective hydraulic pallet assembly with a new pallet assembly, heavy equipment must be used to move the defective hydraulic pallet assembly while the machine tool is idle.

SUMMARY OF THE INVENTION

An improved machine tool has a plurality of work stations and hydraulic pallet assemblies which are sequentially moved along a main guide system extending between the work stations. Each of the hydraulic pallet assemblies has a clamp assembly which grips a workpiece while machining operations are performed on the workpiece. In accordance with one feature of the invention, a test station is provided at a location offset to one side of the path of movement of the hydraulic pallet assemblies between the work stations.

A hydraulic pallet test assembly is provided at the test station. The hydraulic pallet test assembly includes a movable base with secondary guides which receive a hydraulic pallet assembly from the main guide system. A motor is connected with the base of the test assembly to move a hydraulic pallet assembly from the main guide system onto the secondary guides. A connector assembly is then used to connect hydraulic fluid pressure with the pallet assembly to enable hydraulic equipment which forms part of the pallet assembly to be tested. The test assembly is movable away from the test station to enable a hydraulic pallet assembly disposed on the test assembly to be moved to a remote location for repair purposes.

Accordingly, it is an object of this invention to provide a new and improved method and apparatus for testing hydraulic pallet assemblies which are movable between work stations in a machine tool.

BRIEF DESCRIPTION OF THE DRAWINGS

The foregoing and other objects and features of the present invention will become more apparent upon a consideration of the following description taken in connection with the accompanying drawings wherein.

DESCRIPTION OF ONE SPECIFIC PREFERRED EMBODIMENT OF THE INVENTION

Machine Tool

Figure 1:
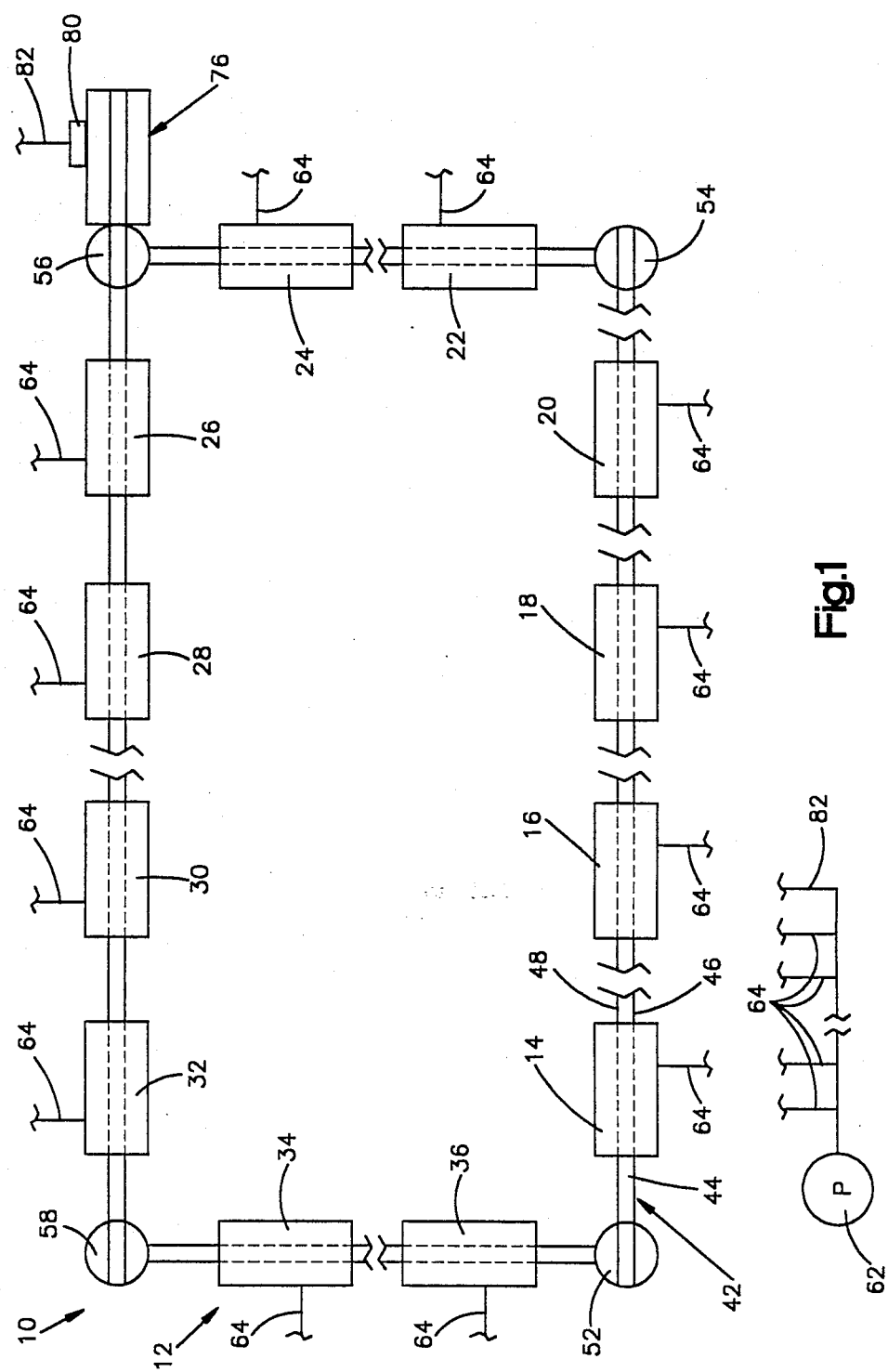
FIG. 1 is a simplified schematic illustration of an apparatus for sequentially machining a plurality of workpieces.

A known machine tool 10 for sequentially machining workpieces is schematically illustrated in FIG. 1. The machine tool 10 includes a rectangular array 12 of work stations 14, 16, 18, 20, 22, 24, 26, 28, 30, 32, 34, and 36. Workpieces are transported between the work stations 14-36 on a plurality of identical hydraulic pallet assemblies 40 (FIG. 2) of known construction.

The hydraulic pallet assemblies 40 move along a main pallet guide system 42 (FIG. 1) which extends through each of the work stations 14-36. In one specific embodiment of the invention, the main pallet guide system 42 includes a main track 44 having parallel rails 46 and 48 which extend along a rectangular path through the work stations 14-36. Rotatable turntables 52, 54, 56, and 58 are provided at the corners of the rectangular main pallet guide system 42 to transfer hydraulic pallet assemblies 40 from one linear length of the main track 44 to a next succeeding length of the track in a known manner. Although it is preferred to move the hydraulic pallet assemblies 40 along the rails 46 and 48 and to provide turntables 52-58 to turn the pallet assemblies, other known types of guide systems could be used if desired.

Hydraulic fluid is supplied under pressure to the work stations 14-36 (FIG. 1) by a pump 62 through conduits 64. The hydraulic fluid supplied by the pump 62 is utilized at the work stations 14-36 to perform various work operations and to effect actuation of apparatus in the hydraulic pallet assemblies 40.

During operation of the apparatus 10 to sequentially machine workpieces, a workpiece is loaded onto a hydraulic pallet assembly 40 at a first work station or loading station 14 (FIG. 1). The hydraulic pallet assembly arrives at the loading station 14 with clamp assemblies 68 (FIG. 2) in a disengaged or released condition. At the loading station 14, a workpiece is loaded onto the hydraulic pallet assembly 40.

A quick disconnect-connect coupling system is connected with the hydraulic pallet assembly 40 at the loading station 14. Hydraulic pressure is then conducted through a conduit 64 to the pallet assembly 40. A pressure regulator valve at the loading station 14 pressurizes clamp actuators 70 (FIG. 2) with sufficient initial hydraulic pressure (approximately 755 psi) to cause three of four clamp assemblies 68 to engage the workpiece and to prevent sequence valves in the hydraulic pallet assembly 40 from cycling. The conduit 64 is then disconnected from the hydraulic pallet assembly 40.

The hydraulic pallet assembly 40 and clamped workpieces move along the main track 44 from the loading station 14 to a clamping station 16 (FIG. 1). At the clamping station 16, another quick connect-disconnect coupling assembly is connected with the hydraulic pallet assembly 40. The clamp actuators 70 are then connected in fluid communication with drain and relatively weak springs in the clamp assemblies 68 move them to a disengaged condition. The workpiece is then accurately aligned with the clamp assemblies 68. The hydraulic pressure conducted to the clamp actuators 70 is then gradually increased to a low clamp pressure (approximately 2,130 psi).

As the hydraulic pressure increases, the first three clamp assemblies 68 operate. A sequence valve in the pallet assembly 40 then operates to direct hydraulic pressure to a floating stop in the pallet assembly. This pressure causes the floating stop to rise until it contacts the workpiece. Another sequence valve in the hydraulic pallet assembly 40 then operates to direct hydraulic pressure to the actuator 70 for the fourth clamp assembly 68. The fourth clamp assembly 68 then moves into engagement with the opposite side of the workpiece.

When the hydraulic fluid pressure conducted to the clamp actuators 70 has increased to a low clamp pressure (2,130 psi), an adjustable pressure operated mechanical pin is advanced. This actuates a limit switch in the quick connect-disconnect coupling assembly to indicate to control apparatus at the clamping station 16 that the low clamp pressure has been reached. Once this has been confirmed, control valves at the clamping station 16 are actuated to transmit a high clamp pressure (3,528 psi) to the clamp actuators 70.

When the relatively high clamp pressure (3,528 psi) is reached, a second pressure indicating pin advances to close a high pressure limit switch. As the clamp pressure is being increased to the relatively high clamp pressure, an accumulator 72 (FIG. 2) in the hydraulic pallet assembly 40 is also charged. Once the accumulator 72 has been charged and the clamp assemblies 68 operated by the high clamp pressure, the quick connect-disconnect coupling assembly is disconnected from the pallet assembly 40. As this occurs, check valves close and seal off the pallet assembly 40 so that the relatively high clamp pressure is maintained in the clamp assemblies 68. The accumulator 72 compensates for any slight amount of leakage of hydraulic fluid from the pallet assembly 40 as the connector assembly is disconnected.

The hydraulic pallet assembly 40 then moves to a next succeeding work station 18. When the coupling assembly reaches the work station 18, a check is made of the high and low pressure pins. Assuming that the pins are in positions indicating the presence of the high clamp pressure, a roughcutting machining operation is undertaken.

Once rough-cutting machining operations have been completed, either at the work station 18 or at a succeeding work station (not shown), the hydraulic pallet assembly 40 is moved along the main guide system 42 to a work station 20. At the work station 20, the clamp assemblies 68 are released and the workpiece is accurately positioned relative to the hydraulic pallet assembly 40. The clamp assemblies 68 are then re-engaged under the influence of the low clamp pressure (2,130 psi) to firmly grip the workpiece for subsequent machining operations. This low clamp pressure is maintained on the clamp assemblies 68 as the hydraulic pallet assembly 40 is moved along the main guide system 42 from the work station 20 through each of the work stations 22-36 in turn.

At each of the work stations 22-36, the external low pressure indicator pin is checked. If the low pressure indicator pin indicates that the hydraulic pressure in the clamp assemblies 68 is less than the low clamp pressure (2,130 psi), the hydraulic pallet assembly 40 is reconnected with the pump 62 through a quick connect-disconnect coupling assembly and the pressure increased to the desired low clamp pressure. However, due to the presence of the accumulator 72, during normal operation of the apparatus 10, it will not be necessary to recharge the hydraulic system in a pallet assembly 40 after the pallet assembly leaves the work station 20. In the event that the hydraulic pressure in a pallet assembly 40 should decrease below the low clamp pressure, due to a malfunction of the apparatus in the pallet assembly, the necessity of recharging the pallet assembly is noted by a computer control system.

Although the foregoing description of the operation of the apparatus 10 has been in conjunction with a single pallet assembly 40, it should be understood that there are a substantial number of pallet assemblies disposed at various locations along the main pallet guide system 42 at any given time during operation of the apparatus 10. Thus, in one specific instance, the apparatus 10 could be operated with as few as twenty hydraulic pallet assemblies 40 or as many a twenty-six hydraulic pallet assemblies. When extra pallet assemblies are present on the main pallet guide system 42, one or more pallet assemblies are stored at locations between the work stations 14-36.

Although the apparatus 10 has been illustrated in FIG. 1 as having twelve work stations, in one specific embodiment of the apparatus, there were twenty-four work stations. The twenty-four work stations included eleven CNC controlled machining centers. This specific embodiment of the apparatus 10, including the hydraulic pallet assemblies 40, is a Grob Flexible Manufacturing System (Grob No. 3105) obtained from Grob-werke GMBH & Co. Kg, Unternehmensberich, Ernst Grob Werkzeugmaschinen, D-8948 Mendelheim, Postfach 1262, West Germany.

It should be understood that although the foregoing description relates to one specific known apparatus 10 for machining workpieces, it is contemplated that the present invention will be utilized in conjunction with other known types of apparatus. Thus, the specific number of work stations and hydraulic pallet assemblies and the specific hydraulic pressures have been set forth herein merely for purposes of clarity of description. It is contemplated that different numbers of work stations and/or pallet assemblies and hydraulic pressures may be utilized. Although it is preferred to have hydraulic pressure operate the clamp assemblies to an engaged condition and to have relatively weak springs operate the clamp assemblies to a disengaged condition, the clamp assemblies could be operated to the disengaged condition against the influence of relatively strong springs or could be operated between both the engaged and disengaged conditions by hydraulic pressure if desired.

Test Station

In accordance with a feature of the present invention, a test station 76 (FIGS. 1 and 2) is provided with a test assembly 78 (FIG. 2) to test any one of the hydraulic pallet assemblies 40 which appears to be defective due to an inability to maintain hydraulic fluid pressure, loosening of a clamp assembly and/or other reasons. Thus, a hydraulic pallet assembly 40 which appears to be malfunctioning is moved from the main pallet guide system 42 to the test station 76. The test station 76 is offset to one side of the path of movement of the hydraulic pallet assemblies 40 through the work stations 14–36.

At the test station 76, a hydraulic pallet assembly 40 which appears to be malfunctioning is tested by the pallet test assembly 78 (FIG. 2) to determine if it is defective. If the test indicates that minor repairs are required to fix the defective hydraulic pallet assembly 40, the pallet assembly is repaired at the test station 76 and then moved back onto the main pallet guide system 42. If extensive repairs are required to fix a hydraulic pallet assembly 40, the pallet test assembly 78, with the defective pallet assembly thereon, is moved from the test station 76 to a remote repair location.

To enable a hydraulic pallet assembly 40 to be realistically tested at the test station 76, the pallet test assembly 78 includes a quick connect-disconnect connector assembly 80. The connector assembly 80 is connected with the pump 62 (FIG. 1) through a conduit 82. The same hydraulic pressure cycles which are used to operate the clamp assemblies 68 at the various work stations 14–36 are supplied by the connector assembly 80 to a hydraulic pallet assembly 40 at the test station 76. This enables the clamp assemblies 68, valves, and other apparatus in the hydraulic pallet assembly 40 to be checked at the test station 76 under the same conditions which are present at the work stations 14–36.

The pallet test assembly 78 is provided with suitable controls to enable each of the clamping operations which are performed at the work stations 14–36 to be duplicated at the test station 76. Although it is preferred to conduct hydraulic pressure from the pump 62 through the conduit 82 to the connector assembly 80 at the test station 76, a separate source of hydraulic pressure for the connector assembly 80 could be provided at the test station 76 if desired. Regardless of where the source of hydraulic pressure is located, the pallet test assembly 78 is operable to conduct to a hydraulic pallet assembly 40 disposed at the test station 76, hydraulic pressures which correspond to the hydraulic pressures conducted to a hydraulic pallet assembly at the work stations 14–36.

The pallet test assembly 78 (FIG. 2) includes a movable base or test stand 88. The movable test stand 88 is secured, by releasable connections 90 and 92, to a base 94 of the apparatus 10. The connections 90 and 92 secure the test stand 88 to the base 94 of the apparatus 10 to hold the test stand against movement relative to the apparatus 10 during movement of a hydraulic pallet assembly 40 onto or off of the test stand.

When a hydraulic pallet assembly 40 needs relatively extensive repairs, the connectors 90 and 92 are released. The connector assembly 80 is disconnected from the test stand 88. The test stand 88 is then moved to a remote location where the repairs are made. When this is done, another test stand can be connected with the base 94 to enable another hydraulic pallet assembly 40 t be tested.

A secondary pallet guide system 96 is provided on the test stand 88. The secondary pallet guide system 96 includes a pair of tracks 98 and 100 having the same cross sectional configuration as the tracks 46 and 48 of the apparatus 10. The hydraulic pallet assemblies 40 have support surfaces which engage tracks of the main pallet guide system 42 and the secondary pallet guide system 96.

Figure 2:
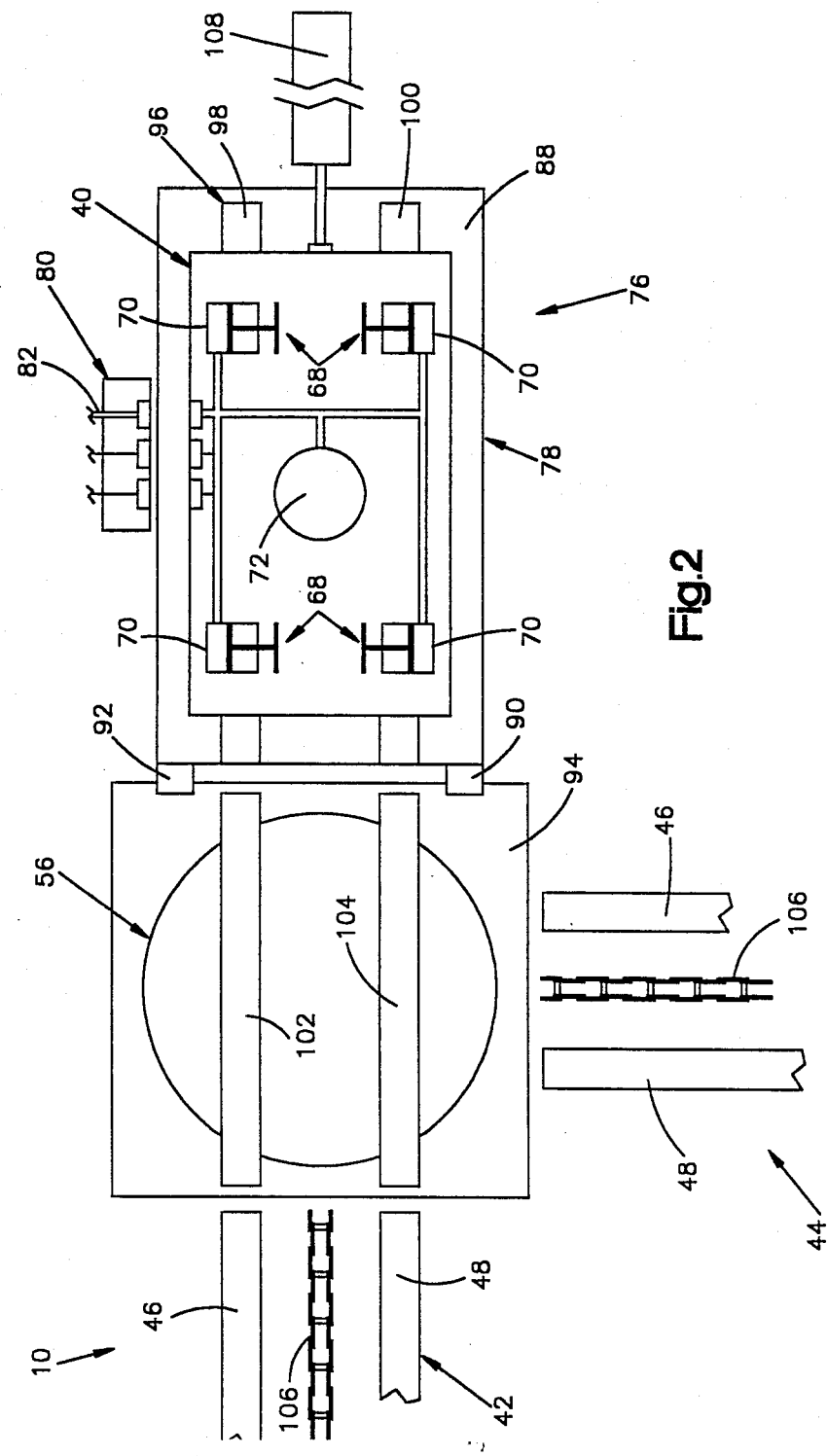
FIG. 2 is an enlarged schematic illustration depicting the relationship of a hydraulic pallet assembly to a test station in the apparatus of FIG. 1.

When the test stand 88 is connected with the base 94 and the turntable 56 is in the position shown in FIG. 2, the test stand tracks 98 and 100 are vertically and horizontally aligned with tracks 102 and 104 on the turntable 56. This enables a hydraulic pallet assembly 40 to be readily moved from the turntable 56 onto the test stand 88. Of course, if a hydraulic pallet assembly 40 is not suspected of being defective, the pallet assembly would be removed from the turntable 56 along the tracks 46 and 48 of the apparatus 10, in the normal manner, by a drive chain 106 disposed between the tracks 46 and 48.

Operation

Figure 3:
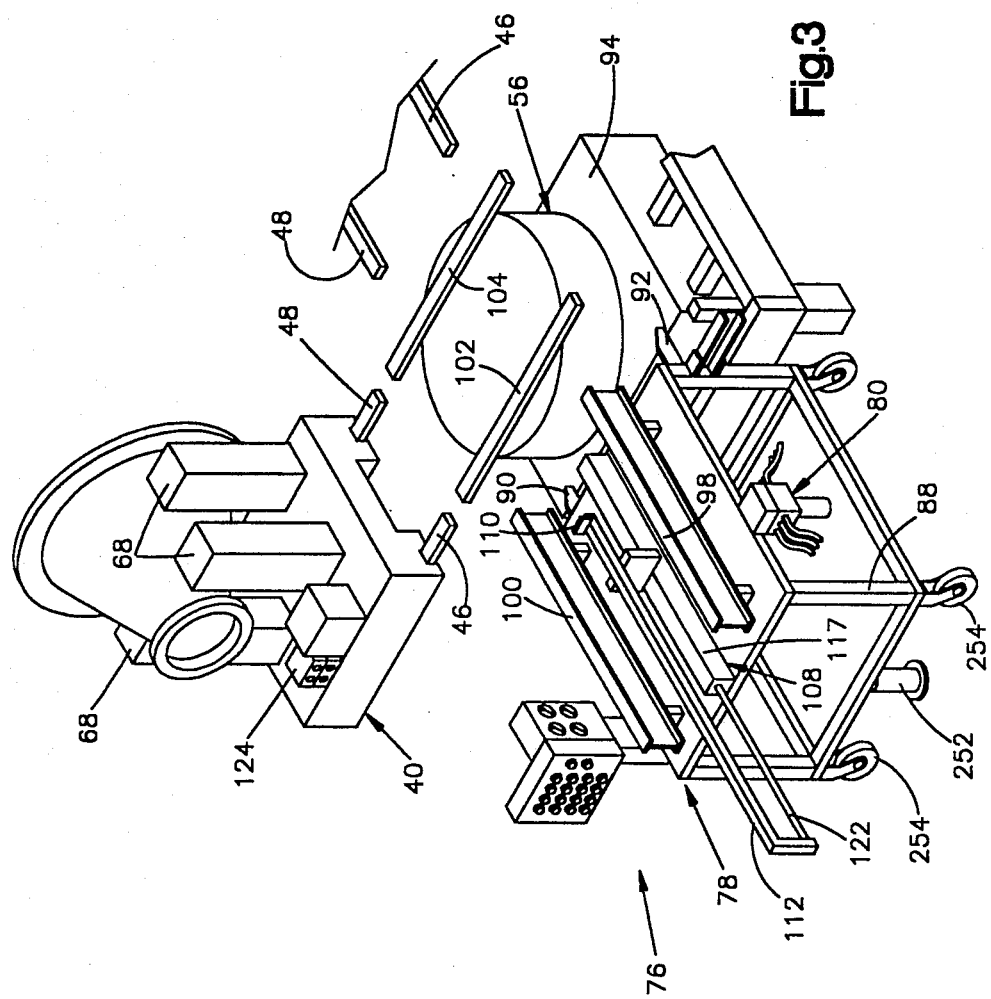
FIG. 3 is a schematic pictorial illustration depicting the manner in which a hydraulic pallet assembly, with a workpiece clamped thereon, approaches a turntable adjacent to the test station of FIG. 2.

A hydraulic pallet assembly 40 which is suspected as being defective is moved along the tracks 46 and 48 by the drive chain 106 (FIG. 2) until the pallet assembly 40 approaches the turntable 56 (FIG. 3). At this time, the turntable 56 is positioned as shown in FIG. 3 with the tracks 102 and 104 aligned with the leftwardly extending tracks 46 and 48 (as viewed in FIG. 3). The suspect hydraulic pallet assembly 40 is then moved onto the turntable 56. The turntable 56 and hydraulic pallet assembly 40 are rotated through 90° about a vertical axis to move the suspect pallet assembly to the orientation shown in FIG. 4.

Figure 4:
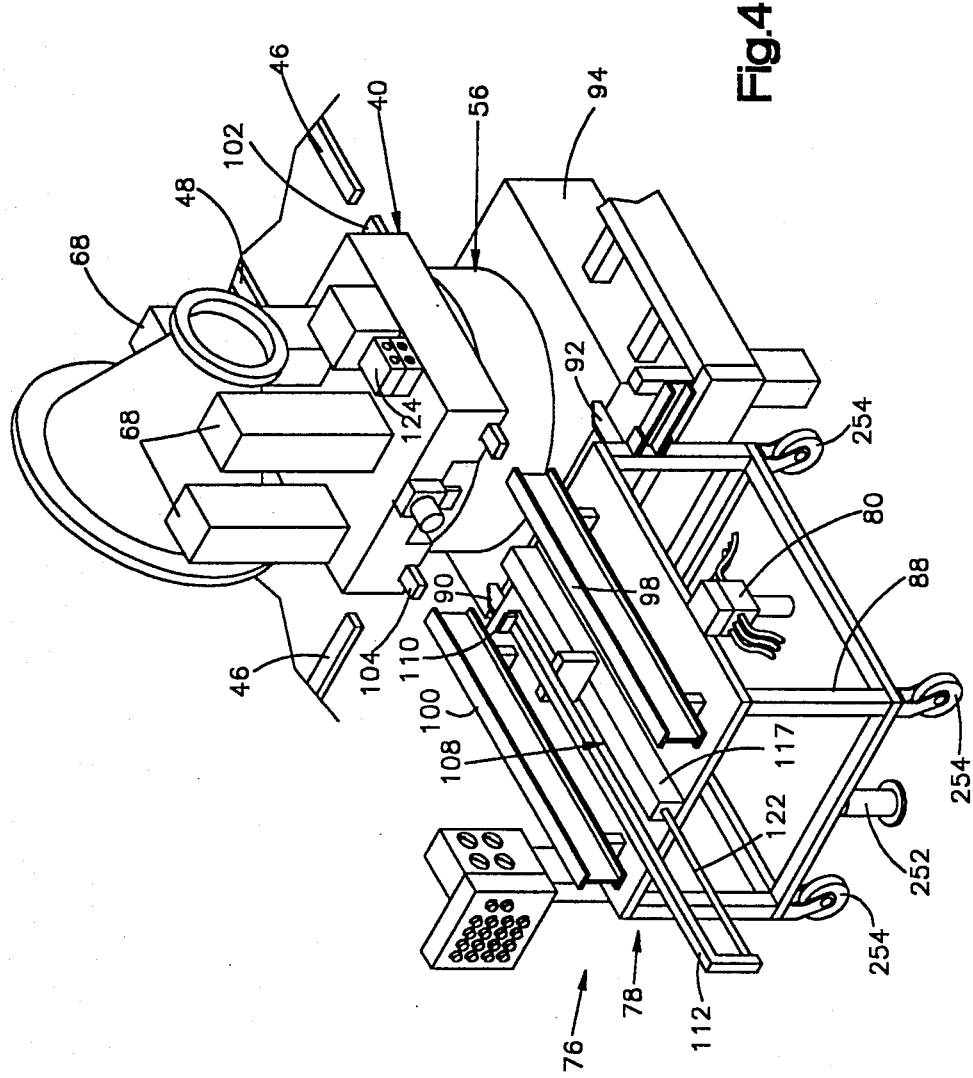
FIG. 4 is a schematic pictorial illustration, generally similar to FIG. 3, illustrating the relationship between the hydraulic pallet assembly and the test station after the pallet assembly has moved onto the turntable and been rotated by the turntable.

When the suspect hydraulic pallet assembly 40 is in the orientation shown in FIG. 4, it is positioned for movement from the turntable 56 onto the test stand 88. Thus, the turntable tracks 102 and 104 are vertically and horizontally aligned with the tracks 98 and 100 on the test stand 88.

Figure 6:
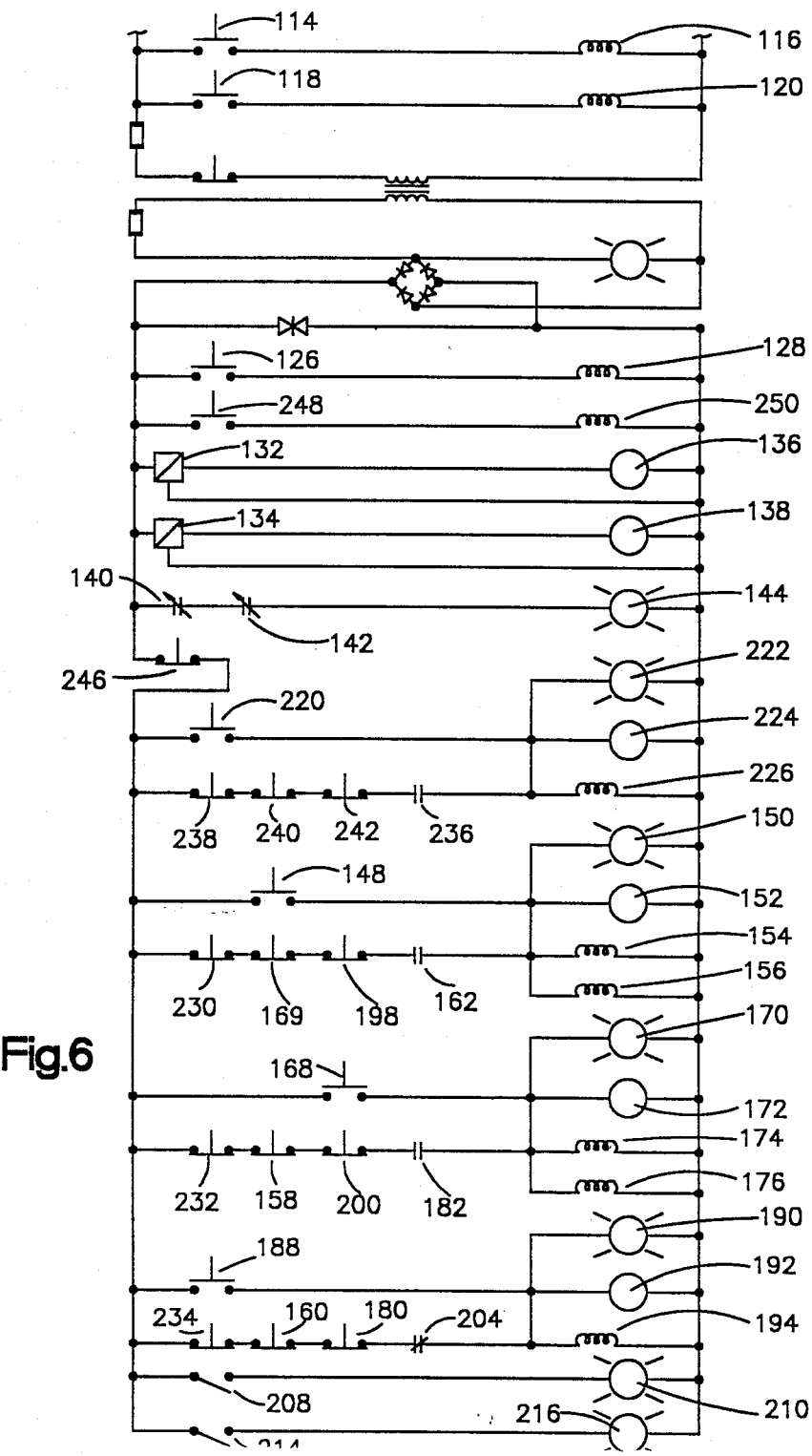
FIG. 6 is a simplified schematic illustration of control circuitry associated with the test station.

A piston and cylinder type motor 108 on the test stand 88 is operable to move the suspect hydraulic pallet assembly 40 from the turntable 56 onto the test stand. Thus, the motor 108 is operated from the partially retracted condition of FIG. 4 to a fully retracted condition. As this occurs, a connector 110 on one end of a bar 112 moves toward the right (as viewed in FIG. 4) into engagement with the hydraulic pallet assembly 40. To retract the motor 108, a switch 114 (FIG. 6) at the test station 76 is manually actuated to energize a solenoid 116. Energization of the solenoid 116 connects a source of air pressure to the rod end of a motor cylinder 117. This causes the motor 108 to retract. As the motor 108 retracts, the connector 110 moves into engagement with the hydraulic pallet assembly 40 on the turntable 56.

Figure 5:
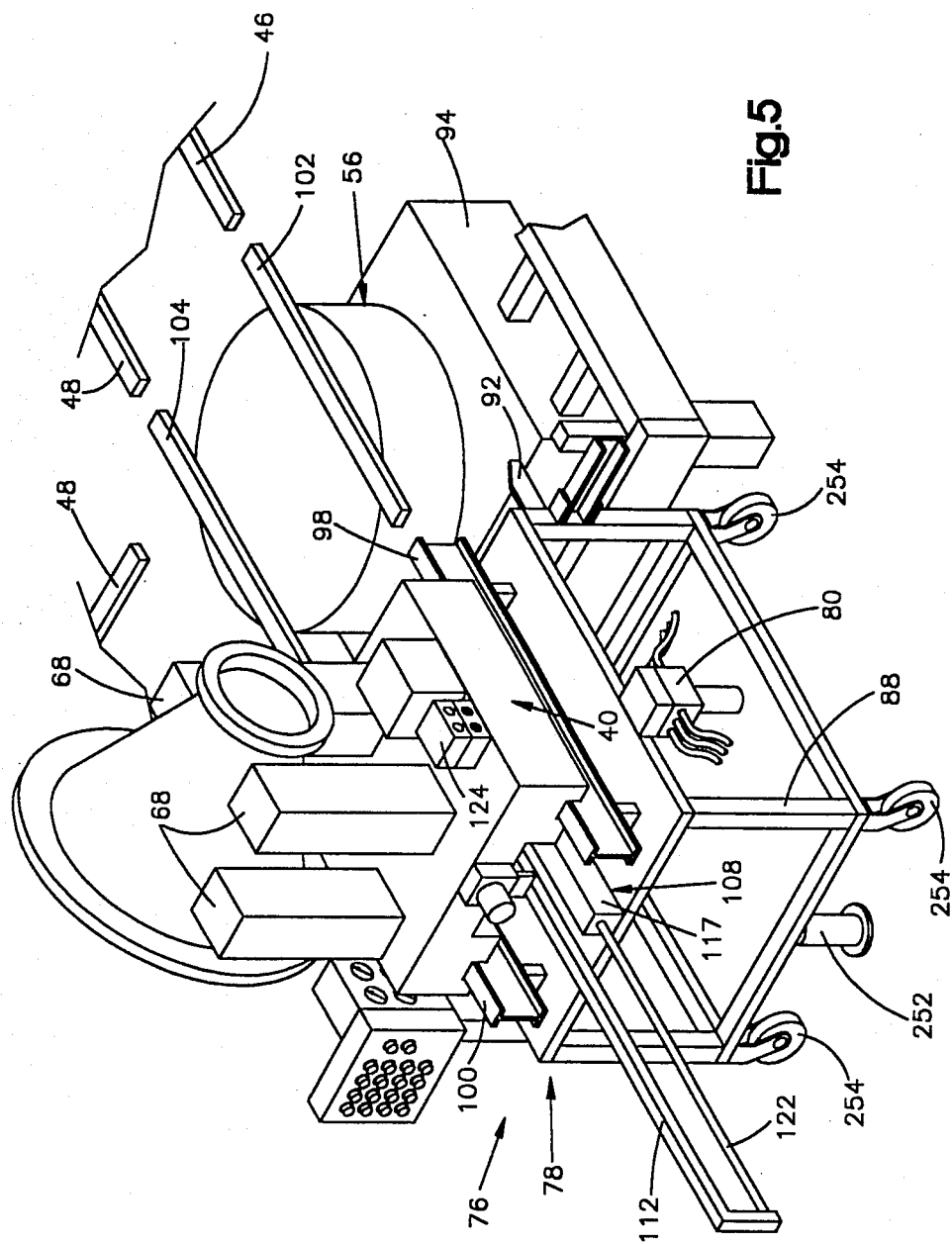
FIG. 5 is a schematic pictorial illustration, generally similar to FIGS. 3 and 4, illustrating the relationship between the hydraulic pallet assembly and the test station when the hydraulic pallet assembly has been moved from the turntable to the test station.

Once the connector 110 has engaged the hydraulic pallet assembly 40, a switch 118 (FIG. 6) is actuated to energize a solenoid 120. This connects the source of air pressure to the head end of the motor cylinder 117. A piston rod 122 and piston (not shown) in the the motor 108 then move toward the left (as viewed in FIG. 4). This pulls the suspect hydraulic pallet assembly 40 from the turntable 56 onto the tracks 98 and 100 on the test stand 88, that is from the position shown in FIG. 4 to the position shown in FIG. 5. It should be noted that the motor cylinder 117 is fixedly connected to the test stand 88 at a location midway between the tracks 98 and 100 and has an operating stroke extending parallel to the tracks 98 and 100.

Once the hydraulic pallet assembly 40 has been pulled onto the test stand 88, the connector assembly 80 is connected in engagement with a connector head 124 on the hydraulic pallet assembly 40. A switch 126 (FIG. 6) is then manually actuated to energize a solenoid 128. Energizing the solenoid 128 causes left and right fluid couplings in the connector 80 to extend into engagement with socket assemblies in the connector head 124. The construction and mode of operation of the connector 80 is the same as the construction and mode of operation of the known connector provided at the clamping station 16.

When the couplings in the connector 80 have been extended, proximity switches 132 and 134 (FIG. 6) energize relays 136 and 138. Energizing the relays 136 and 138 closes their normally open contacts 140 and 142 to energize a light 144 (FIG. 6) which indicates that both couplings have been engaged.

Once the connector 80 (FIG. 5) at the test station 76 has been connected with the connector head 124 on the hydraulic pallet assembly 40, testing of the hydraulic pallet assembly can be undertaken. During operation of the apparatus 10 (FIG. 1), the hydraulic pallet assembly 40 is initially connected with a very low clamping pressure (755 psi). To initiate testing of operation of the clamp assemblies 68 under the influence of this relatively low pressure, a switch 148 (FIG. 6) is manually closed.

Closing the switch 148 results in energization of a indicator light 150 and relay 152. In addition, solenoids 154 and 156 are energized to conduct the relatively low initial clamp pressure to the connector head 124 through the connector 80. Actuation of the switch 128 opens its normally closed contacts 158 and 160. Energizing the solenoids 154 and 156 results in the relatively low initial clamping pressure (755 psi) being conducted from the connector assembly 80 to the connector head 124 on the hydraulic pallet assembly 40. This pressure actuates three of the four clamp assemblies 68 in the same manner as is normally done at the loading station 14. Energization of the relay 152 closes its normally open contact 162 to maintain the solenoids 154 and 156 energized even though the switch 148 is released.

In order to test the hydraulic pallet assembly 40 under the influence of the next higher pressure, that is the low clamp pressure (2,130 psi), the control switch 168 (FIG. 6) is manually actuated. Manual actuation of the control switch 168 causes its normally closed contact 169 to open. This causes deenergization of the initial clamp pressure indicator light 150, relay 152, and solenoids 154 and 156.

At the same time, closing of the low clamp pressure switch 168 also effects energization of the low clamp pressure indicator light 170 and relay 172. In addition, the low pressure solenoids 174 and 176 are energized. When the switch 168 is manually actuated, its normally closed contacts 180 open. Energizing the solenoids 174 and 176 connects the low clamp pressure (2,130 psi) to the hydraulic pallet assembly 40 through the connector 80 and connector head 124. This results in the clamp assemblies 68 being actuated under the influence of the low clamp pressure. Manual actuation of the switch 168 and energizing of the relay 172 results in closing of the normally open relay contacts 182 to provide a holding circuit for energization of the solenoids 174 and 176.

When the hydraulic pallet assembly 40 is to be exposed to high clamp pressure (3,528 psi), a switch 188 (FIG. 6) is closed. Closing the switch 188 energizes the indicator light 190 and a relay 192. In addition, the solenoid 194 is energized.

Energization of the solenoid 194 results in the high clamp pressure being conducted from the connector assembly 80 to the connector head 124 on the hydraulic pallet assembly 40 at the test station 76. The clamp assemblies 68 are then actuated by the high clamp pressure (3,528 psi). When the switch 188 is actuated, its normally closed contacts 198 and 200 are opened to deenergize the initial and low clamp pressure circuits. In addition, energization of the relay 192 results in closing of the holding contacts 204.

When the clamp assemblies 68 are being actuated by the low clamp pressure, a low clamp pressure indicator pin in the connector head 124 (FIG. 5) is extended. Extending the low pressure indicator pin actuates a low clamp pressure indicator switch 208 (FIG. 6) in the connector 80 to energize an indicator light 210. When the hydraulic pallet assembly 40 is being exposed to the high clamp pressure, a high clamp pressure indicator pin in the connector head 124 (FIG. 5) is extended. Extending the high pressure indictor pin actuates a high clamp pressure switch 214 (FIG. 6) to energize a high clamp pressure indicator light 216 along with the low clamp pressure indicator light 210.

When the high clamp pressure tests have been completed, an unclamp switch 220 is manually actuated to energize an unclamp light 222, relay 224, and an unclamp solenoid 226. As the switch 220 is closed, its normally closed contacts 230, 232, and 234 are opened to be certain that the initial clamp pressure, low clamp pressure, and high clamp pressure solenoids are deenergized. Energization of the relay 224 closes its normally open holding contacts 236. Energization of the solenoid 226 results in the connector assembly 80 being connected with reservoir so that hydraulic actuators 70 (FIG. 2) in the clamp assemblies 68 are connected with reservoir and returned to their disengaged condition.

The initial clamp switch 148 (FIG. 6) has normally closed contacts 238 which are open when the initial clamp switch 148 is actuated. Similarly, the low clamp pressure switch 168 has normally closed contacts 240 which are open when the low clamp pressure switch 168 is actuated. Finally, the high clamp pressure switch 188 has contacts 242 which are opened when the high pressure clamp switch 188 is actuated. The contacts 238, 240, and 242 make certain that the unclamp solenoid 226 is not energized to connect the hydraulic pallet assembly 40 with reservoir at the same time that one of the clamping pressure switches is manually actuated. A stop test or interrupt switch 246 is provided to interrupt the testing of a hydraulic pallet assembly 40.

When the testing of a hydraulic pallet assembly 40 has been completed, a switch 248 is manually actuated to energize a solenoid 250. This causes the couplings in the connector assembly 80 (FIG. 5) to retract and the proximity switches 132 and 134 to deenergize the relays 136 and 138.

Once the clamp assembly 68 and hydraulic pallet assembly 40 have been actuated by the same fluid pressure to which they are exposed during operation of the apparatus 10, a determination can be made as to the probable cause of a malfunction in the hydraulic pallet assembly 40. If only minor repairs are required, the repairs can be made while the hydraulic pallet assembly 40 is at the test station 76. However, if major repairs are required, the connectors 90 and 92 (FIG. 2) with the base 94 of the apparatus 10 are disengaged and a floor clamp 252 (FIG. 5) is released. This enables the test stand 88 and defective hydraulic pallet assembly 40 to be moved to a remote repair station where major repairs can be made on the hydraulic pallet assembly.

A plurality of wheels 254 (FIG. 5) are provided on the test stand 88 to facilitate movement of the test stand and defective hydraulic pallet assembly 40 to the remote repair location. Once the test stand 88 has been moved from the test station 76, a second test stand 88 can be moved to the test station. This enables a second hydraulic pallet assembly 40 to be tested while repairs are being made on the first hydraulic pallet assembly at the remote repair station.

During testing of the hydraulic pallet assembly 40 at the test station 76, the apparatus 10 (FIG. 1) can continue to operate in its normal manner. This is because the pallet test assembly 76 includes a connector 88 with its own source of fluid pressure and does not rely on fluid pressure from one of the work stations in the apparatus 10. Therefore, the tests can be conducted on a hydraulic pallet assembly 40 at the test station 76 without interfering with operation of the apparatus 10. This minimizes down time for the apparatus 10.

Once a hydraulic pallet assembly 40 has been tested and, if necessary, repaired, the hydraulic pallet assembly is moved back onto the main pallet guide system 42 of the apparatus 10. Thus, at a time when a hydraulic pallet assembly 40 is not approaching the turntable 56 (FIG. 5) along the main guide tracks 46 and 48, the turntable is actuated to align the tracks 102 and 104 with the tracks 98 and 100 on the test stand 88. The tested and, if necessary, repaired hydraulic pallet assembly 40 is moved back onto the tracks 102 and 104 on the turntable 56 by retracting the motor 108 from the extended condition shown in FIG. 5. Of course, after testing, the hydraulic pallet assembly 40 is charged with the low clamp pressure (2,130 psi) before the pallet assembly is returned to the turntable 56.

To retract the hydraulic motor 108, the switch 114 (FIG. 6) is manually closed to energize the solenoid 116. As previously mentioned, energization of the solenoid 116 results in air under pressure being connected to the rod end of the motor 108 to push the hydraulic pallet assembly 40 from the position shown in FIG. 5 to the position shown in FIG. 4. Once the hydraulic pallet assembly 40 has been moved onto the turntable 56 (FIG. 4) the connector 110 for the motor 108 is disconnected from the hydraulic pallet assembly and the motor 108 is partially extended to retract the connector from the path of movement of hydraulic pallet assemblies 40 along the tracks 46 and 48.

Summary

In view of the foregoing description, it is apparent that the present invention provides a new and improved machine tool 10 having a plurality of work stations 14–36 and hydraulic pallet assemblies 40 which are sequentially moved along a main guide system 42 extending between the work stations. Each of the hydraulic pallet assemblies 40 has a clamp assembly 68 which grips a workpiece while machining operations are performed. In accordance with one feature of this invention, a test station 76 is provided at a location offset to one side of the path of movement of the hydraulic pallet assemblies 40 between the work stations 14–36.

A hydraulic pallet test assembly 78 is provided at the test station 76. The hydraulic pallet test assembly 78 includes a movable base 88 with secondary guides 98 and 100 which receive a hydraulic pallet assembly 40 from the main guide system 42. A motor 108 is connected with the base 88 of the test assembly 78 to move a hydraulic pallet assembly 40 from the main guide system 42 onto the secondary guides 98 and 100 disposed on the base 88. Once a hydraulic pallet assembly 40 has been moved to the test station 76, a connector assembly 80 is operable to connect hydraulic pressure with the pallet assembly to enable hydraulic equipment which forms part of the pallet assembly to be tested. The test assembly 78 is movable away from the test station 76 to enable a pallet assembly 40 disposed on the base 88 to be moved to a remote location for repair purposes.

Having described a specific preferred embodiment of the invention, the following is claimed:

1. An apparatus for sequentially machining a plurality of workpieces, said apparatus comprising an array of work stations, said array of work stations including a plurality of machining stations, a plurality of hydraulic pallet means for holding workpieces to be machined at said machining stations, each of said hydraulic pallet means including clamp means for gripping a workpiece and hydraulic actuator means for effecting operation of said clamp means between an engaged condition in which said clamp means is effective to grip a workpiece and a disengaged condition in which said clamp means is ineffective to grip a workpiece, at least one of said work stations including means for connecting hydraulic fluid pressure with said hydraulic actuator means to effect operation of said clamp means between the engaged and disengaged conditions, main guide means extending between said work stations for guiding movement of said hydraulic pallet means along a path extending between said work stations, a testing station disposed to one side of the path of movement of said hydraulic pallet means between said work stations, and hydraulic pallet testing means at said test station for testing said hydraulic pallet means, said hydraulic pallet testing means including secondary guide means for guiding movement of said hydraulic pallet means from the path of movement of said hydraulic pallet means between said work stations to said testing station and for guiding movement of said hydraulic pallet means from said testing station back to the path of movement of said hydraulic pallet means between said work stations, and means at said testing station for connecting hydraulic fluid pressure with said hydraulic pallet means to test operation of said hydraulic actuator means under the influence of hydraulic fluid pressure.

2. An apparatus as set forth in claim 1 wherein said hydraulic pallet testing means includes motor means for moving a selected one of said hydraulic pallet means from said main guide means to said testing station and for moving the selected one of said hydraulic pallet means from said testing station back to said main guide means after testing of the selected on of said hydraulic pallet means at said testing station.

3. An apparatus as set forth in claim 1 further including pump means for supplying hydraulic fluid under pressure to at least one of said work stations, said means at said testing station for connecting hydraulic fluid pressure with said hydraulic pallet means including means for connecting hydraulic fluid pressure supplied by said pump means with said hydraulic pallet means to enable said pump means to be used to supply hydraulic fluid pressure to said hydraulic pallet means at said testing station and said one work station.

4. An apparatus as set forth in claim 1 wherein said hydraulic pallet testing means includes a base upon which said secondary guide means is disposed and means for supporting said base for movement between a first location in which said secondary guide means is adjacent to said main guide means and a second location in which said secondary guide means is spaced from said main guide means to enable a hydraulic pallet means to be moved onto said secondary guide means when said base is at the first location and to enable work to be performed on a hydraulic pallet means disposed on said secondary guide means when said base is at the second location.

5. An apparatus as set forth in claim 1 wherein said main guide means includes a main track which extends between said work stations, each of said hydraulic pallet means including support means for engaging said main track, said secondary guide means includes a relatively short length of secondary track which has the same configuration as said main track and is engagable by said support means on said hydraulic pallet means.

6. An apparatus for use in association with a machine tool having a plurality of hydraulic pallets which are movable along a main guide means which extends between a plurality of work stations, said apparatus comprising a base, secondary guide means disposed on said base for guiding movement of a hydraulic pallet from the main guide means onto said base and for guiding movement of a hydraulic pallet from said secondary guide means back onto the main guide means, pallet moving means connected with said base and operable to move a hydraulic pallet from the main guide means onto said secondary guide means and to move a hydraulic pallet from said secondary guide means back onto the main guide means, and connector means for connecting hydraulic fluid pressure with a hydraulic pallet disposed on said secondary guide means to test hydraulic equipment which forms part of the hydraulic pallet.

7. An apparatus as set forth in claim 6 wherein said pallet moving means includes motor means and second connector means for engaging a hydraulic pallet to connect the hydraulic pallet with said motor means, said motor means including means for applying force to said second connector means to move a hydraulic pallet off of the main guide means and onto said secondary guide means and for applying force to said second connector means to move a hydraulic pallet off of said secondary guide means onto the main guide means.

8. An apparatus as set forth in claim 7 wherein said motor means includes a piston and cylinder assembly having a cylinder which is connected to said base and a piston which is connected to said second connector means.

9. An apparatus as set forth in claim 6 further including means for supporting said base for movement between a first location in which said secondary guide means is adjacent to the main guide means and a second location in which said secondary guide means is spaced from said main guide means to enable a hydraulic pallet to be moved onto said secondary guide means when said base is at the first location and to enable work to be performed on a hydraulic pallet disposed on said secondary guide means when said base is at the second location.

10. An apparatus as set forth in claim 9 further including releasable connector means for use in connecting said base with the machine tool when said base is at the first location to retain said base against movement relative to the machine tool during movement of a hydraulic pallet onto and off of said secondary guide means.

11. An apparatus as set forth in claim 6 wherein said secondary guide means includes a pair of tracks connected with said base and having surfaces for engaging a hydraulic pallet to guide movement of the hydraulic pallet relative to said base.

12. An apparatus as set forth in claim 11 wherein said pallet moving means includes a cylinder connected to said base and disposed between said tracks, a piston disposed in said cylinder, and connector means for connecting said piston with a hydraulic pallet to move the hydraulic pallet along said tracks upon operation of said pallet moving means.

13. A method comprising the steps of sequentially moving each pallet of a plurality of pallets to a work station, connecting a source of hydraulic fluid pressure with each pallet in turn at the work station, operating a clamp assembly under the influence of hydraulic fluid pressure to grip a workpiece on each pallet in turn, disconnecting the source of hydraulic fluid pressure from each pallet in turn at the work station after performing said step of operating a clamp assembly to grip a workpiece, moving each pallet in turn from the work station along a path extending to a plurality of machining stations, performing machining operations at the machining stations on workpieces held by clamp assemblies on the pallets, moving a pallet with a workpiece thereon from the path of movement of the pallets to a testing station disposed to one side of the path of movement of the pallets from the work station to the plurality of machining stations, connecting a source of hydraulic fluid pressure with the pallet at the testing station, operating a clamp assembly on the pallet at the testing station under the influence of hydraulic fluid pressure, and, thereafter, moving the pallet from the testing station back into the path of movement of the pallets from the work station to the plurality of machining stations.

14. A method as set forth in claim 13 further including moving the pallet which was moved from the testing station back into the path to a machining station and performing machining operations on the workpiece held by the clamp assembly on the pallet.

15. A method as set forth in claim 13 wherein said step of moving a pallet from the path of movement of the pallets includes rotating the pallet about a vertical axis extending through the pallet and then moving the pallet along a secondary path to the testing station.

16. A method as set forth in claim 13 wherein said steps of connecting a pallet with a source of hydraulic fluid pressure while the pallet is at the work station and connecting a pallet with a source of hydraulic fluid pressure while the pallet is at the testing station includes connecting the pallet with the same source of hydraulic fluid pressure.

17. An apparatus for use in association with a machine tool having a plurality of pallets with hydraulically actuated clamps to grip workpieces during movement of the pallets along a main track which extends between a plurality of work stations, said apparatus comprising a movable base, releasable connector means for use in connecting said base with the machine tool, a secondary track disposed on said base for guiding movement of a pallet from the main track onto said base and for guiding movement of a pallet form said base back onto the main track when said base is connected with the machine tool by said releasable connector means, motor means connected with said base, second connector means connected with said motor means for engaging a pallet disposed on the main track and for transmitting force between said motor means and an engaged pallet to move the engaged pallet off of the main track onto said secondary track and to move the engaged pallet off of said secondary track onto the main track, means for supporting said base for movement between a first location in which said secondary track is adjacent to the main track and a second location in which said secondary track is spaced from the main track to enable a pallet to be moved onto said secondary track when said base is at the first location and to enable work to be performed on a pallet disposed on said secondary track when said base is at the second location, and means for connecting hydraulic fluid pressure with a pallet on said secondary track to hydraulically actuate clamps on the pallet.

* * * * *